Sept. 29, 1959 C. H. FLANIGAN 2,906,081
BLADE SPEED CONTROLLER FOR ELECTRIC LAWN MOWER
Filed March 15, 1957 2 Sheets-Sheet 1
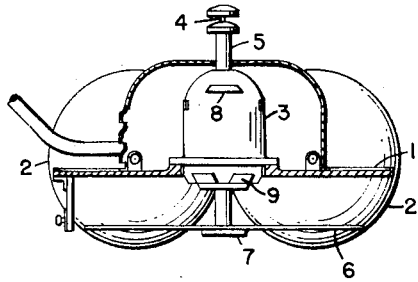
Fig.1
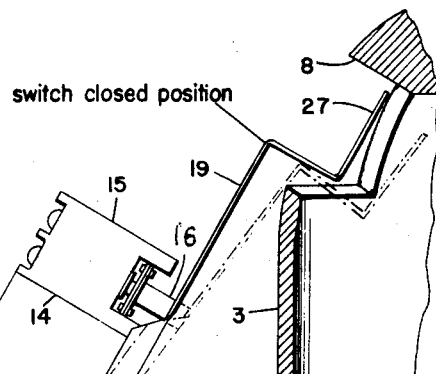
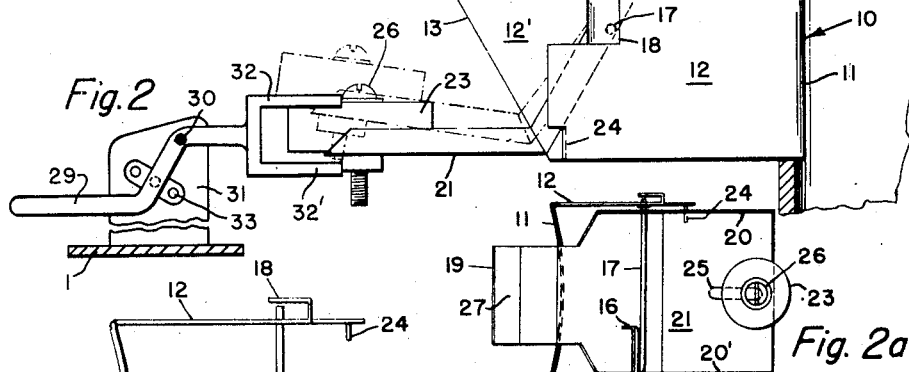
Fig.2  Fig.2a
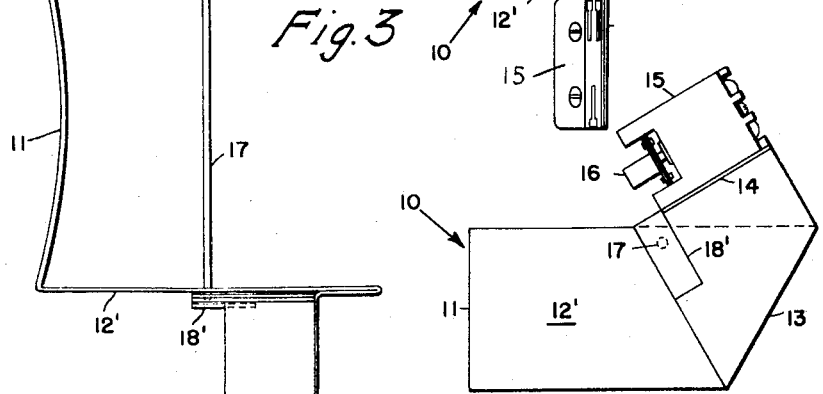
Fig.3  Fig.4
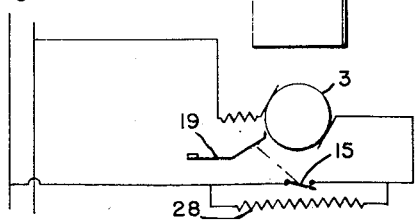
Fig.5
INVENTOR.
CLIFFORD H. FLANIGAN
BY Arthur H Robert
ATTORNEY

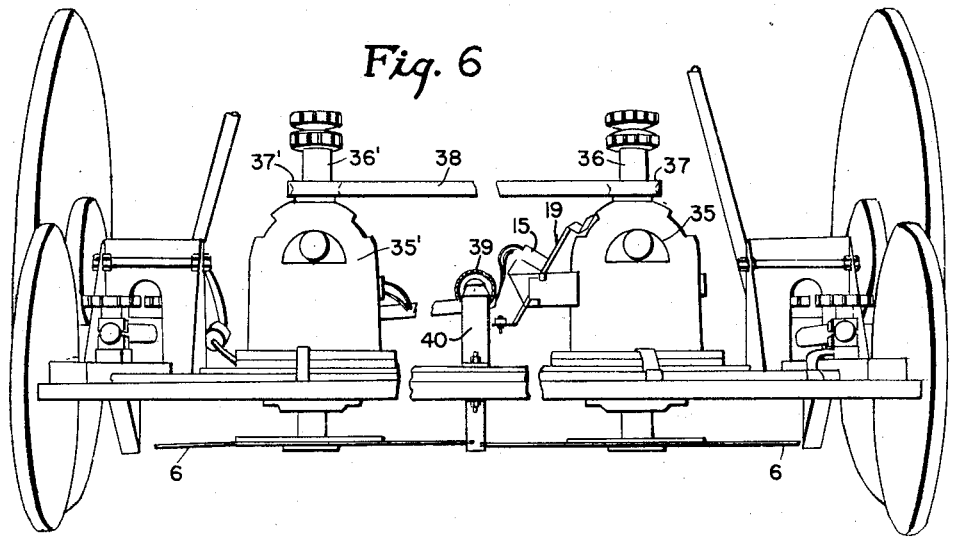
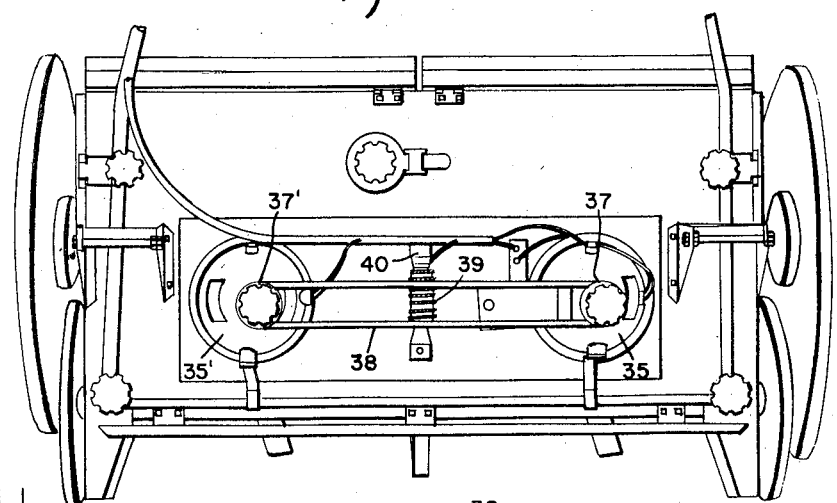
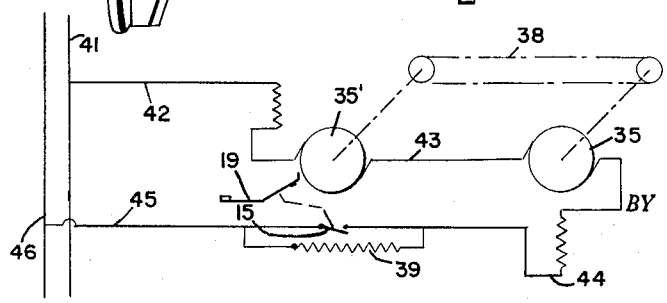
INVENTOR.
CLIFFORD H. FLANIGAN
BY
Arthur H. Roberts
ATTORNEY United States Patent Office 2,906,081
Patented Sept. 29, 1959

2,906,081

BLADE SPEED CONTROLLER FOR ELECTRIC LAWN MOWER

Clifford H. Flanigan, New Albany, Ind.

Application March 15, 1957, Serial No. 646,254

5 Claims. (Cl. 56—25.4)

The present invention relates to electric mowers of the rotating blade type and has particular reference to a novel method of an apparatus for controlling the electric motor drive for the rotating blades. This invention is an improvement on the rotating blade type of electric mower described and claimed in my U.S. Patent #2,643,502, granted June 30, 1953, which disclosure is here incorporated by reference, and is a continuation-in-part of U.S. application, S.N. 373,093, filed August 10, 1953, Patent No. 2,791,876, issued May 14, 1957.

The use of a series wound electric drive motor on this type of mower is desirable for various reasons. However, if the blade structure rotates at a speed high enough to be effective under full load conditions, it will, under progressively lower load conditions, operate at progressively higher speeds and, in the upper portion of its speed range, usually produce an objectionable noise. For example, with a motor producing a blade speed of 5,000 r.p.m. at full load and 10,000 r.p.m. at no load, the blade noise will become increasingly objectionable at speeds ranging from 7,000 r.p.m. upwards.

One of the principal objects of this invention is to provide a speed control device for a series wound electric motor using substantial amounts of current, such as a lawn mower motor, which will satisfactorily limit the speed of the motor below a predetermined value over a load range extending from full load to no load.

Another of the principal objects of this invention is to provide a speed control arrangement for an electric lawn mower which, under load conditions, ranging from full load to no load, limits the speed of the blade to an operating range extending from its normal speed at full load to a higher speed corresponding to its normal speed at a predetermined partial load, the partial load speed preferably being below the objectionable noise range.

Other important objects are: to attain the previous objects by means operating, in response to variations in the ventilating air flow of a fan cooled drive motor, to control or set the upper limit of the operating blade speed at a predetermined value; and to attain these objects by an automatic switch means which will operate over a long period of time while handling substantial amounts of electrical current without breakdown caused by the burning of its contact points.

In constructing a mower for cutting a swath of, say, double width, two blades rotating on separate axes are employed. To drive both blades from a single series wound motor, an expensive, specially constructed heavy duty 220–230 volt motor would be required for all practical purposes. On the other hand, two separate independently operated 110–115 volt series wound motors may be used and electrically connected either in series or in parallel. None of these arrangements is wholly satisfactory for various reasons.

My previously mentioned application, S.N. 373,093, is directed to a wholly satisfactory drive arrangement utilizing separate series wound motors for each rotating blade and mechanically interconnecting these motors so that they share the load more or less equally under all conditions of operation ranging from a full load on both blades and motors to no load on both and including a partial or full load on one blade with a lower load on the other blade ranging downwardly to no load.

Another important object of this invention is to provide a multiple electric motor load-sharing drive arrangement with means opertaing, in response to the ventilating air flow variations of at least one motor, to limit the highest operating speeds of both blades to a value which is relatively unobjectionable from a noise producing standpoint.

Embodiments of the invention are illustrated in the accompanying drawing wherein:

Figure 1 is a central sectional view of one embodiment taken on a longitudinal plane passing vertically through the electric drive motor and blade structure but showing both of these parts in elevation;

Figure 2 is a side elevational view on an enlarged scale of a speed controller applied to a drive motor, such as is shown in Figure 1, the motor housing being fragmentarily shown in section;

Figure 2a is a top plan view on a reduced scale of the speed controller as it appears in Figure 2, this view showing the bracket rotated a half turn from its Figure 2 position and omitting the motor housing;

Figure 3 is a top plan view of the bracket which forms a part of the speed controller shown in Figure 2 and 2a and which supports that controller on the motor;

Figure 4 is an end elevational view of the bracket shown in Figure 3, looking at the lower end of that bracket as it appears in Figure 3 but adding to it a control switch;

Figure 5 is a schematic diagram illustrating the operating principle of the speed controller;

Figure 6 is a front elevational view of another embodiment showing an electric mower embodying the load-sharing feature of my invention as well as the speed control feature;

Figure 7 is a top plan view of the embodiment shown in Figure 6; and

Figure 8 is a schematic diagram of the mower of Figure 6, this figure illustrating the speed control and load-sharing features.

The electric mower shown in Figure 1 is constructed substantially as described in my U.S. Patent No. 2,643,502, granted June 30, 1953. This mower comprises a base plate or chassis 1 supported on wheels 2, and carrying a hollow shaft series wound motor 3 with a rod 4 extending through the hollow shaft 5 of the motor and carrying the cutting blade 6 driven by the motor through a friction clutch connection 7. The motor housing has one or more openings 8 through which air is drawn by a fan fixed on the motor armature for cooling the motor, the air being discharged at the bottom of the motor through suitable openings 9.

The speed controller shown in Figs. 2–5 includes a bracket 10 mounted on the motor housing adjacent one of the openings 8. This bracket preferably is constructed from a sheet metal strip bent into U-shape to provide a bight 11, and a pair of arms 12, 12'. One arm 12' is doubled back at 13 on a biased line disposed at about 45° and then bent outwardly or laterally to provide a shelf 14 on which is mounted a microswitch 15 of the snap-action type.

This type of switch has an operating arm 16 which is resiliently or yieldably urged outwardly from the switch toward the switch-open position. When the arm 16 is moved a slight distance one way or another, it triggers the switch contact points (not shown) to snap to an open position or closed position depending upon the direction of arm movement. This closing or opening of the switch contacts is performed at a high speed to keep from developing arcs between them. I have found that a microswitch of this type will operate indefinitely, as a resistance short circuiting switch, under normal current loads of 6 to 12 amperes without burning the switch contact points. This switch is mounted on shelf 14 with its operating arm 16 extending transversely parallel to the body of the switch and projecting therefrom transversely across the adjacent edge of arm 12′ of bracket 10 with its projecting end terminating in an inwardly bent tip. The tip is inwardly bent at right angles more or less to extend toward or into the space between bracket arms 12 and 12′.

The bracket arms cooperate to carry an axle 17 which is retained against removal, from its position on the bracket, by bending bracket-arm tips 18 and 18′ to extend over the ends of the axle 17. A rocker arm 19 made of a strip of sheet metal is positioned with its mid-portion arranged to extend transversely across the space between bracket arms 12 and 12′. This rocker arm 19 has reinforcing flanges 20 and 20′ at its sides. The axle 17 extends through flanges 20, 20′ and thus mounts the rocker arm 19 for pivotal movement relatively to bracket 10.

The lower end 21 of the rocker arm is bent relatively to its mid-portion and arranged to carry a counterweight 23 which yieldably urges the lower end of the rocker arm pivotally downward into engagement with a stop 24 on bracket arm 12. This counter weight is adjustably mounted in a slot 25 by a bolt 26 and cooperating nut. The upper end of the rocker arm 19 is bent toward the motor housing to provide an offset vane 27 which extends into the opening 8 of the motor 3 where it is subject to and influenced by the ventilating air that enters the motor housing through opening 8. The tip of the switch arm 16 bears on the rocker arm 19 above the axle 17. The counterweight 23 is sufficient to hold the rocker arm yieldably against stop 24 in the solid line position shown in Fig. 2 during the lower speed and lower air flow ranges of operation of the motor 3. When the rocker arm 19 is in this heavy load or low-speed and low-air flow position, it holds the switch arm 16 in the switch-closed position wherein switch 15 short-circuits a resistance 28 in series with the motor 3.

As the load falls, the speed and air flow rises, the latter ultimately reaching a point where it moves the rocker arm 19 to the switch-open dotted line position shown in Fig. 2. This movement opens the switch 15 and cuts the resistance 28 into the circuit, thus reducing the voltage across the motor. With the voltage reduced, the speed of the motor is reduced. If the load progressively falls off to no-load, the speed will be readily held below the objectionable noise range by using a resistance of appropriate value.

In operation, I assume: that a series wound 110–115 volt motor, operating between 5,000 and 10,000–12,000 r.p.m. under full load and no-load conditions respectively, is employed; that the noise of the cutting blade begins to be objectionable at speeds ranging from 7,000 r.p.m. upwardly; and that the rocker arm 19 is counterweighted so that it will operate in the neighborhood of 5,500 to 5,800 r.p.m. Under full-load conditions, the counterweight will hold the switch in the closed position. When the load decreases enough to allow the speed to rise to 5,800 r.p.m., the air flow will have become sufficient to move the rocker arm 19 inwardly, in relation to the motor housing, to the extent required to allow the switch arm 16 to move to the switch-open position. This will reduce the speed to a value, say approximating 5,500, and, at the same time, reduce the current flow from, say, 10 amperes to 6 amperes. But this reduction in speed and current will not necessarily cause the switch to reclose without a further reduction in speed.

If the load continues to fall off, the speed will continue to increase but the increase is less substantial now, with the resistance in the circuit, than it would be with the resistance short circuited. With a proper resistance in the circuit, the no-load speed will be less than 7,000 r.p.m. The setting of the speed controller may be varied but, under most conditions of operation, it is preferably set to operate in the 75–85% load range. In other words, it should operate at a speed substantially below that at which the noise becomes objectionable and substantially above the full-load operating speed.

Under certain conditions of operation, where higher blade speeds are desired, as is the case in pulverizing leaves or in cutting heavy strands of thick grass, the setting may be varied to a higher value either by using a smaller weight 23 or shifting the counterweight in the slot 25 to reduce its distance from the fulcrum shaft 17.

Also, under certain operating conditions, the operator may desire to keep the switch 15 in either a closed or an open position regardless of the speed of the motor 3. This may be done by moving the control arm 29 to either of its extreme positions from the middle position shown in Fig. 2 which allows the rocker arm 19 to operate the switch in the normal manner. The control arm 29 is pivotally mounted on a pivot pin 30 fixed to an upstanding bracket 31 which in turn is fixed to the lawn mower chassis 1. One end of the arm 29 includes a bifurcated portion having upper and lower legs 32 and 32′ extending over and under the lower end 21 of the rocker arm 19. These legs are spaced sufficiently so that when arm 29 is in its middle position, the legs will not interfere with the normal movement of the rocker arm 19, but when the arm 29 is in either of its extreme positions, one leg or the other will engage the rocker arm and hold it in either a switch open or a switch closed position. The arm 29 also includes a detent (on the rear side of the arm in Fig. 2) adapted to be selectively engaged in appropriate detent holes 33 in the bracket 31 to hold the arm 29 in any of its three positions.

In the embodiment shown in Figs. 6 to 8, the frame of the mower supports two motors 35, 35′ which may be 110–115 volt motors substantially like motor 3. Each of these motors carries a cutter blade 6 mounted on the motor shafts 36 and 36′ as before. One of these motors, say motor 35, preferably is equipped with the above-described speed controller. The motor shafts 36 and 36′ carry V pulleys 37, 37′, respectively, and a V belt 38 extends around these pulleys. This arrangement compels the motors to operate at the same speed and to share the load. A resistor 39 is mounted on a bracket 40 on the chassis.

A 220–230 volt circuit for operating the motors, is shown in Fig. 8. It places the motors 35 and 35′ and the speed controller all in series. Accordingly, current flows from power line 41, lead line 42, motor 35′, connecting line 43, motor 35, line 44, the speed controller, and line 45 to power line 46. With this arrangement, both motors will share the load more or less equally at all times.

Where both cutting blades are operating under the same load conditions, each motor will drive its own blades more or less independently of the other. However, where one blade operates under a lighter load condition than the other blade, the motor of the lightly loaded blade will tend to increase its speed. In doing this, it simply tends to drive the belt 38, connecting it to the other motor, at a higher rate of speed and, as a result, takes some of the load from the heavily loaded motor, the ultimate division of the load being substantially equal. Where the speed of both motors tends to rise above the predetermined value at which rocker arm 19 operates, that arm will operate to open the switch 15 and place the resistor 39 in series with both motors and thus limit the upper speed range as before.

The advantage of the speed control arrangement resides in the fact that it facilitates the operation of the lawn mower under all load conditions without producing an objectionable noise. In this connection, it will be appreciated that the capacity or power of the drive motor is reduced by the speed controller only in the lighter load ranges where a reduction in work capacity can be afforded.

It is anticipated that a modification of the described speed control arrangement may utilize a centrifugal force responsive means rotating with the motor shaft in place of the air flow responsive vane for operating the snap-action switch between open and closed positions.

Having described my invention, I claim:

1. An electric lawn mower comprising: an electric series-wound motor having a housing, a vertically arranged drive shaft therein and a cutter on the lower end portion of said shaft, said housing having vent openings; a motor-cooling fan located within said housing and mounted on said shaft for flowing air through said vent openings at a speed which increases and decreases with the motor speed; an electric circuit operatively connected to said motor, said circuit including a resistor, a bypass around said resistor and a switch for opening and closing said bypass; and operating means for opening and closing said bypass respectively as the motor speed rises beyond the high limit of a low motor speed range and falls below the low limit of a high motor speed range, said high limit being of a higher value than said low limit, said means including a vane, means movably mounting said vane adjacent one of said vent openings in position to be operated in one direction by the air current passing through the one opening, opposing means yieldably urging said vane in the opposite direction, and means operatively interconnecting said operating means and said switch for closing said bypass when the speed of said motor is reduced due to the imposition of a heavy load on said cutter.

2. The mower of claim 1 wherein: said switch is of a type which opens with a snap-action.

3. The mower of claim 1 wherein: said opposing means includes a counterweight biasing said vane in said opposite direction.

4. The mower of claim 1 including: means selectively operable to hold said switch in one of its positions regardless of the speed of said motor.

5. The mower of claim 1 including: a mobile lawn mower frame; said motor being mounted on said frame; a second electric series-wound motor mounted on said frame and having a second vertical drive shaft carrying a cutter on its lower end portion; said electric circuit operatively connecting said second motor in series with said first-mentioned motor; and power transmitting means mechanically interconnecting the shafts of both of said motors to compel both motors to share the total load and to operate at coordinated speeds.

References Cited in the file of this patent

UNITED STATES PATENTS

| | | |
|---|---|---|
| 2,144,734 | Jepson | Jan. 24, 1939 |
| 2,425,178 | Ellerbeck | Aug. 5, 1947 |
| 2,643,502 | Flanigan | June 30, 1953 |
| 2,791,876 | Flanigan | May 14, 1957 |